United States Patent
Fruensgaard et al.

(10) Patent No.: US 6,513,036 B2
(45) Date of Patent: Jan. 28, 2003

(54) METHOD AND APPARATUS FOR SEARCHING AND PRESENTING SEARCH RESULT FROM ONE OR MORE INFORMATION SOURCES BASED ON CONTEXT REPRESENTATIONS SELECTED FROM THE GROUP OF OTHER USERS

(75) Inventors: Finn Ove Fruensgaard, Aalborg (DK); Jesper Kjærsgaard, Gistrup (DK)

(73) Assignee: Mindpass A/S, Aalborg (DK)

( * ) Notice: Subject to any disclaimer, the term of this patent is extended or adjusted under 35 U.S.C. 154(b) by 65 days.

(21) Appl. No.: 09/373,619

(22) Filed: Aug. 13, 1999

(65) Prior Publication Data

US 2002/0052880 A1 May 2, 2002

(51) Int. Cl.$^7$ .............................................. G06F 17/30
(52) U.S. Cl. .............................. 707/4; 707/10; 707/102; 707/501.1; 707/513; 707/5; 345/968
(58) Field of Search .................. 707/1–10, 100–104.1, 707/500.1, 501.1, 513–514, 900–902, 907; 709/200–203, 206, 217–218, 238, 241; 704/9–10; 345/968

(56) References Cited

U.S. PATENT DOCUMENTS

| | | | | |
|---|---|---|---|---|
| 5,446,891 A | * | 8/1995 | Kaplan et al. ................. 707/2 |
| 5,696,962 A | * | 12/1997 | Kupiec ......................... 707/4 |
| 5,752,022 A | | 5/1998 | Chin et al. .................. 707/100 |
| 5,768,578 A | | 6/1998 | Kirk et al. ..................... 707/10 |
| 5,873,080 A | * | 2/1999 | Coden et al. ................... 707/3 |
| 5,905,862 A | * | 5/1999 | Hoekstra ..................... 101/483 |
| 5,920,859 A | * | 7/1999 | Li ................................. 707/5 |
| 5,978,799 A | * | 11/1999 | Hirsch ............................ 707/4 |
| 5,987,446 A | * | 11/1999 | Corey et al. ................... 707/3 |
| 5,987,454 A | * | 11/1999 | Hobbs ........................... 707/4 |
| 6,005,565 A | * | 12/1999 | Legall et al. ................ 345/721 |
| 6,098,065 A | * | 8/2000 | Skillen et al. ................. 707/3 |
| 6,169,997 B1 | * | 1/2001 | Papierniak et al. ...... 707/501.1 |
| 6,182,065 B1 | * | 1/2001 | Jeomans ........................ 707/3 |
| 6,182,068 B1 | * | 1/2001 | Culliss .......................... 707/5 |
| 6,199,067 B1 | * | 3/2001 | Geller ......................... 707/10 |
| 6,314,420 B1 | * | 11/2001 | Lang et al. ................... 707/10 |
| 6,324,534 B1 | * | 11/2001 | Neal et al. ................... 706/12 |

FOREIGN PATENT DOCUMENTS

| | | | | |
|---|---|---|---|---|
| WO | WO 96/23265 | * | 8/1996 | ..................... 17/30 |
| WO | WO98/09229 | * | 3/1998 | ..................... 17/30 |
| WO | WO 00/77689 A1 | * | 12/2000 | ..................... 17/30 |

\* cited by examiner

Primary Examiner—Srirama Channavajjala
(74) Attorney, Agent, or Firm—Finnegan, Henderson, Farabow, Garrett & Dunner, L.L.P.

(57) ABSTRACT

A method and an apparatus for searching and presenting electronic information from one or more information sources where the retrieval and presentation of information depends on context representations defined for a user performing the search, other users being similar to the user performing the search, and references to information. The context representation of each object affects/influences all the other objects with which it is in contact during the search process. This ensures a dynamic update of the relations between the objects and their properties.

29 Claims, 12 Drawing Sheets

METHOD AND APPARATUS FOR SEARCHING AND PRESENTING SEARCH RESULT FROM ONE OR MORE INFORMATION SOURCES BASED ON CONTEXT REPRESENTATIONS SELECTED FROM THE GROUP OF OTHER USERS

A method and an apparatus for searching and presenting electronic information from one or more information sources.

TECHNICAL FIELD

The present invention relates to a method of searching and presenting electronic information from one or more information sources, said method comprising the steps of:

presenting one or more choices to a user, registering one or more user specified choices, using said one or more user specified choices to retrieve one or more references to information from said information sources, and providing a search result comprising one or more references to information.

The present invention also relates to an apparatus for searching and presenting electronic information from one or more information sources, said apparatus comprising:

presenting means adapted to present one or more choices to a user, registering means adapted to register one or more user specified choices, retrieving means adapted to retrieve one or more references to information from said information sources using said one or more user specified choices, and means adapted to provide a search result comprising one or more references to information.

BACKGROUND AND PROBLEM

Searching in large collections of electronic information, e.g. the Internet, large Intranets, etc., is normally done by software programs called search engines, which typically have an interface with one or more text boxes so that a user may type text usually in the form of keywords describing what he wants to find information about. The search engine supplies links to information sources or the sources themselves containing the relevant information by searching through indexes or taxonomies, i.e. a hierarchy of related contexts and/or topics.

Several search engines are available on the Internet today, the best known engines being Yahoo, Alta-Vista, Lycos, etc.

Searching can generally be described as a transaction oriented type of searching.

In a transaction oriented type of searching a search is executed as fast as possible and in one transaction only. There are no feedback possibilities and therefore no possibility for a search engine to learn what a specific user of the search engine prefers or is generally interested in for later use. If the user is not satisfied with the result of the search, e.g. because it contained too many or too few hits, the user has to input a new search criterion and start all over again.

In a typical transaction oriented type of searching the user specifies one or more keywords e.g. combined with Boolean operators like AND, OR and other criteria like closeness of words, use of synonyms, use of phonetics, etc. The search engine uses one optimal sorting algorithm to find the relevant documents/pieces of information that contain the specified keyword(s), and generally presents this information to the user as a long list of links sorted with regard to how well the information/document contains the keyword(s), i.e. typically sorted according to the highest frequency of the appearance of the specified keyword(s) in the documents in accordance with Boolean rules, phonetics, etc., if any.

All users of the search engine are normally presented with the same standard user interface, i.e. a static user interface, with a text box to specify the keyword(s) and possible Boolean operators and in some cases check boxes representing other possibilities like closeness of words, use of synonyms, use of phonetics or the like. The result of the search is presented in another interface as a list of links to documents containing the specified keyword(s) e.g. sorted as mentioned above. In this way two very different users specifying the same keywords, e.g. safety of cars, will receive exactly the same list of links regardless of whether e.g. one is a potential buyer of a car and the other is a scientist in safety of cars. This gives an often irritating great amount of uninteresting links for both of them.

After being presented with the result, the user generally only has the option of selecting one of the links to the found documents, thereby leaving the search engine or initiating a new search.

There is no possibility of returning to the search engine after reviewing the selected document with information about how relevant the user found that particular document or piece of information and why. So it is impossible for the search engine to make a better choice of presenting the search result the next time.

Another problem of transaction oriented type of searching is that there is no way of determining what the information value of a result is for a user, since the best search result only depends on the best match of the keywords with e.g. a document. For example, if the user specifies the same keyword(s) at two different times and the result is a document saying that the price of oil is increasing, then this document will only have an information value for the user the first time and none the second time.

Yet another drawback of transaction oriented type of searching is the lacking reference to time. If e.g. the keyword 'car' is specified, the corresponding result will always be the same regardless of which prior keywords the user has specified. The user could e.g. have typed Volvo as the last keyword or have shown the greatest interest in Volvo in 75% of all searches related to cars. This knowledge is not available in a search system without a time reference and individuality of the users.

One way of obtaining individuality in searching in the prior art is by the use of user profiles. An individual user profile is obtained by monitoring and storing the keywords which a user specifies over a period of time and tries to determine one or more trends for that period, thereby trying to be able to predict what a user is interested in the future. Additionally a user profile may be updated to reflect how interesting the user found a particular document, etc.

However, such a user profile is not very dynamic or flexible, and unless a user very often searches for the same things and uses the same group of keywords again and again, this kind of user profile does not give any advantages, e.g. if a user one day wants to find information about a certain subject and the next day about a completely different subject, e.g. because he has just learned about it or often does not have an actual goal but just wants to be entertained. Also a keyword is specified at two different times, the user profile generally will change meanwhile, so that two different lists would be presented.

Generally speaking, prior art search engines and user profiles are good at trying to find or re-find documents, which are about the same as the user has shown an interest in before, but they match a query against an already decided and objective topic category in a hierarchy of related categories (sports is parent of ice-hockey, football, soccer, etc.). So the information value of a document in a given topic category is determined by others.

SOLUTIONS

The object of the present invention is to provide a method which enables a user to perform a search for electronic information from one or more information sources, the method enabling a representation of relations between different types of information and different users.

This object is achieved by a method of the type mentioned above, said method further comprising a context representation for one or more references, and a context representation for one or more users, where each context representation contains one or more indications representing other contexts with which each is related, and in that the method further comprises the steps of:

presenting the search result to the user in a number of different ways at the same time based on one or more context representations, and presenting additional choices relating to the search result based on one or more context representations.

Hereby, a method is provided where each object, i.e. references to text document, picture, user, etc., has a representation, i.e. context representation, describing the relations between that particular object and other objects. In this way a very simple and useful way of describing the relations of each object is obtained. The relations between two text documents could e.g. be that a user who found one of them interesting would probably find the other interesting as well. So related objects belonging to a given topic could be connected by their context representations. Furthermore it is possible to locate references to information via intermediate objects.

In general, the context representations comprise all aspects of a collection of information sources, i.e. documents, people using it, user's collections of information, e-mails, etc., and describe relations of and communication with/between people, information, behaviour and individual interests.

The method focuses on continuation of a search process instead of starting all over again. The method is executed with a continuous interaction between intermediate results and intermediate searches. In this way, a user is always presented with the possibility of searching, results of searching and additional choices relating to the results at the same time. The choices the user makes will lead to other results and choices, as the user continuously selects the choices and information he finds relevant or interesting.

All objects in the search process, i.e. references to information, users, search processes, subjects, choices, etc., have a context representation which is used to determine a relation between that particular object and one or more other objects.

For example, a picture of a car could relate positively to an article about cars, news about cars, an article about trains and relate negatively (or not at all) to an article about clothes.

In this way the method is able to provide and present several related references to information, users, subjects, etc. which may have a potential information value for the user in the ongoing search process.

The user may be presented with references to information containing a potential information value together with further choices, thereby being able to review some of the presented information. Preferably the user is also presented with a public virtual topic room where other users have located information which they found relevant for that particular topic. The present user also has the possibility of putting one or more references to information in the public virtual topic room for that particular topic for later retrieval by him and others, or continuing the search in the same or a narrower direction, or changing direction completely if the user gets bored.

In general, it is possible to enhance the search for information by using the context representations, since every type of object can be described, and thereby made searchable, with regard to contents, time, relations, people, communication of people and information like type, topic, link structure, attributes, etc.

Another object of the invention is to provide easy and fast access to information which interests the user by having a collection of information for each user which is private where the user can collect references to information that he finds interesting.

This is obtained if the method further comprises the steps of:

enabling a user to select one or more references to review the information, and enabling a user to collect references to information in a collection of information.

In this way, the user himself may select references to information or information that he finds interesting or relevant during the dynamic and continuous search process for easy access later. After one or more search processes the user gradually builds a private library of references to information of personal interest.

The method may further comprise:

the step of modifying one or more context representations on the basis of one or more context representations, and/or the step of modifying a context representation is done when a user executes an action on the basis of one or more references to information or executes an action on the basis of one or more different users, and/or the step of modifying a context representation is done when the context representation is related with another piece of information or is related with a user.

In this way, relations/context representations between different objects may change or influence each other.

Additionally, a dynamic update of the relations between a user and other users and/or between the user and information is possible, so that they may be dynamically updated, as the search process continues, influencing each other, when a user e.g. selects a choice on the basis of an object, reviews information, keeps a reference to another user or information, etc. This gives a very dynamic system which may describe the preferences of the object over time.

Different information objects may also change their context representation, so that when e.g. a document is located in the virtual topic room by a user, the context representation of the user may influence the context representation of the document.

This is e.g. used in a situation where two users have mutual interests, which may be defined by their mutual relation, and one of them has a relation to a document, then it is more likely that the other user will also find that particular document interesting, i.e. it would have a potential information value for him as well.

The dynamic feature of this method also makes it easy to include new objects, since they only have to be assigned a context representation with preferably pre-set relations. The context representation will then gradually change depending on the search processes in which it is involved. In this way the method is able to handle an information domain that changes rapidly and dynamically like an Intranet of a large company or the Internet.

Another advantage is that the objects and user may dynamically be categorised by their relations to each other and how they interact. This is obtained by updating the context representation/relations for each object, e.g. piece of information, user, search process, etc., when other objects influence/are in contact with this particular object and vice versa. This is done by changing their context representation reflecting the change in their relations.

For example, a user may be categorised by which information, e.g. documents, chat rooms, other users, topics etc., he refers to in his collection of information/virtual topic room.

For example, a document may be categorised by which users, other documents, topics, chat rooms, etc. who/which refer to the document and/or use it.

For example other user virtual rooms may be categorised by the documents they refer to.

Context representations selectively choose (by definition and/or situation) by which other types of context representations they want to be affected and by what amount. For example a users context representation may only be changed by the context representation of a search process, the context representation of a file only by the context representation of a document, etc.

This is different from the prior art which categorises e.g. a document by which words it contains, a picture by which patterns it contains, a search process by keywords, etc.

As the user collects information, he hereby gradually and continuously participates in categorising every object that is part of or is in contact with the ongoing search process in one way or another. Even the search process itself may be categorised. Every object being part of the process has its context representation/its relations changed depending on the other objects with which it comes into contact.

In other words, a hierarchy of topics may be generated, where each topic has a corresponding virtual topic room, where the users themselves put references to documents, files, pictures, etc. The virtual topic room has a context representation/relations as well which change dynamically in response to the words in the communication in the room, and are affected by the context representations of search processes, users, archives, related topics, etc. which refer to the virtual topic room or are placed within it. Hereby the topics are not static or objective but generated dynamically through contexts. There is provided a great number of context representations which dynamically categorise/relate users and communication in the same manner.

This categorisation is dynamic and subjective as opposed to a transaction oriented type of searching where keywords are matched against static categories determined by their keywords.

In a preferred embodiment each object has a unique context representation reflecting the type of the object, i.e. chat-room, document, picture, e-mail, etc.

In another embodiment only parts of a context representation of a given type can be set to be affected only by at least a part of certain other context representations.

In another embodiment each context representation comprises a word part, a topic part and an attribute part. Preferably, the word part contains every word of the information domain and the corresponding relative word frequency in the object for each word, i.e. how many times a specific word appears in the object divided by the total number of words. The relative word frequency is a number between 0 and 1.

The topic part lists every topic of a given hierarchy of topics and for each topic a corresponding probability of that particular topic being related to the ongoing search process/communication.

The attribute part lists parameters which are similar for each type of object. Each parameter may have different types of values. For example each context representation may contain an attribute that indicates which other context representations are able to influence that particular context representation, in what way it is influenced, and by how much. The exact nature of this attribute varies with the type of object.

In another embodiment each context representation comprises a first vector and a second vector, where the first vector comprises information on the information referenced by the context representation, and the second vector comprises information on the change of the context representation as a result of its being affected by other context representations.

The present invention also relates to an apparatus for searching and presenting electronic information from one or more information sources.

An object of the present invention is to provide an apparatus which enables a user to perform a search for electronic information from one or more information sources, thereby enabling a description of relations between different types of information and different users.

This object is achieved by an apparatus of the type mentioned initially, said apparatus further comprising processing means comprising:
  a context representation for one or more references, and
  a context representation for one or more users, where
  each context representation contains one or more indications representing other contexts with which each. is related,
and in that the processing means are adapted to:
  present the search result to the user, via said presenting means, in a number of different ways at the same time based on one or more context representations,
  present additional choices relating to the search result based on one or more context representations.

This gives the same advantages for the same reasons as described previously in relation to the method.

Other embodiments of the apparatus according to the invention are characterized by the features defined in the dependent claims, which are advantageous for the same reasons as described previously in relation to the method.

Further, the invention relates to a computer-readable medium whose contents are adapted to cause a computer system to search and present electronic information from one or more information sources, by performing the steps of:
  presenting one or more choices to a user,
  registering one or more user specified choices,
  using said one or more user specified choices to retrieve one or more references to information from said information sources, and
  providing a search result comprising one or more references to information.

The computer-readable medium according to the invention is characterized in that the medium comprises
- a context representation for one or more references, and
- a context representation for one or more users, where
- each context representation contains one or more indications representing other contexts with which each is related, and by further performing the steps of:
- presenting the search result to the user in a number of different ways at the same time based on one or more context representations, and
- presenting additional choices relating to the search result based on one or more context representations.

Hereby, when a computer is caused to search and present electronic information from one or more information sources,—as a consequence of the contents of a computer-readable medium as described above—the advantages mentioned in connection with the corresponding method and apparatus according to the invention are achieved.

Finally, the invention relates to a computer program element comprising computer program code means adapted to enable a computer system to search and present electronic information from one or more information sources, by performing the steps of:
- presenting one or more choices to a user,
- registering one or more user specified choices,
- using said one or more user specified choices to retrieve one or more references to information from said information sources, and
- providing a search result comprising one or more references to information.

The computer program element according to the invention is characterized in that the program element comprises
- a context representation for one or more references, and
- a context representation for one or more users, where
- each context representation contains one or more indications representing other contexts with which each is related, and by further performing the steps of:
- presenting the search result to the user in a number of different ways at the same time based on one or more context representations, and
- presenting additional choices relating to the search result based on one or more context representations.

When a computer program element causes a computer to enable a computer system to search and present electronic information from one or more information sources, as described above, the advantages mentioned in connection with the corresponding method and apparatus according to the invention are achieved.

BRIEF DESCRIPTION OF THE DRAWING

The present invention will now be described more fully with reference to the drawings, in which.

DETAILED DESCRIPTION

Figure 1:
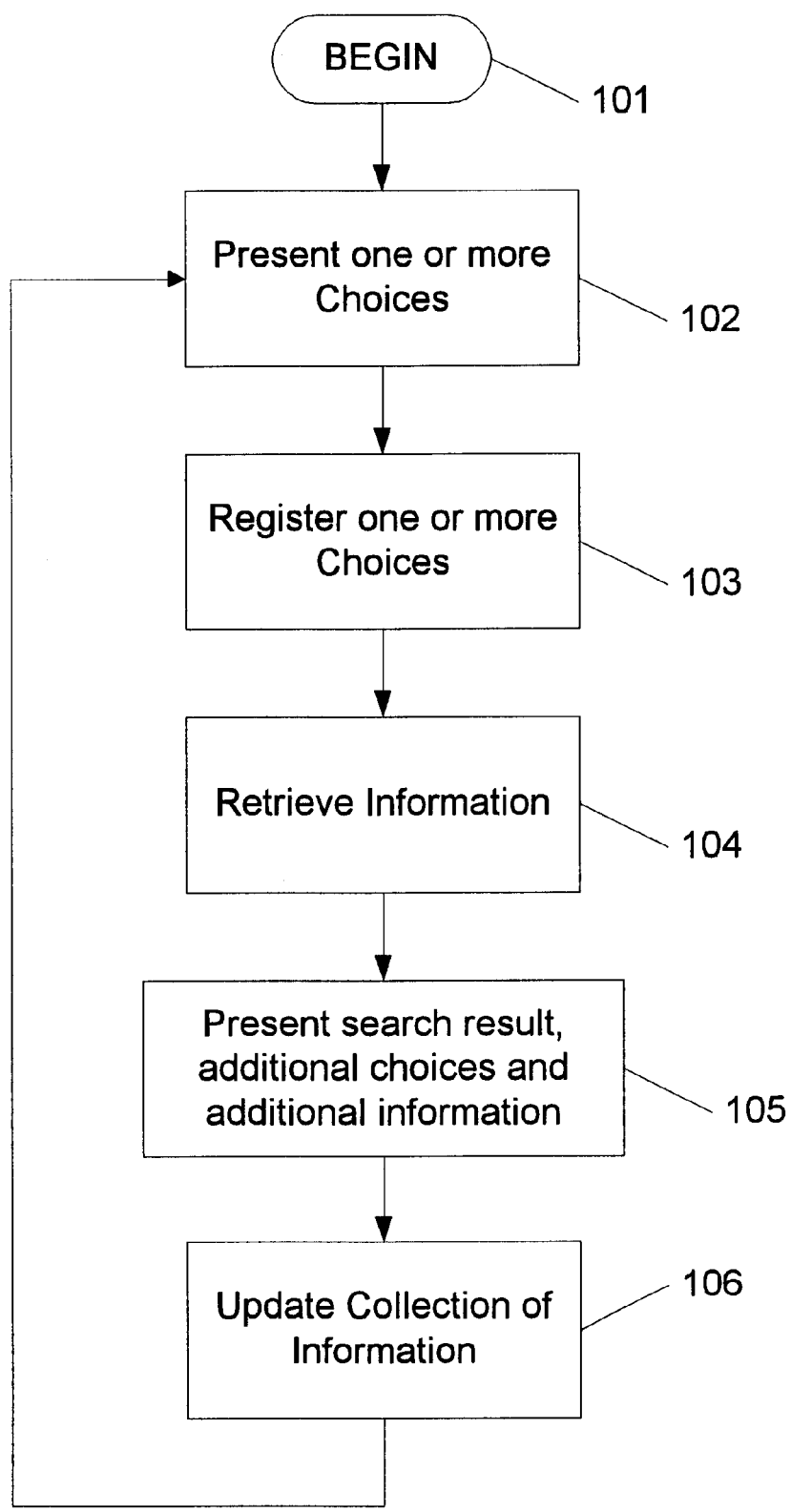
FIG. 1 shows a flowchart of one embodiment of the method according to the invention.

FIG. 1 shows a flowchart of one embodiment of the method according to the invention. In step (101) the method is initialised. In step (102) the user is presented with one or more choices. These choices may contain a text box for specifying one or more keywords representing the kind of information in which the user is interested e.g. together with Boolean operators like AND, OR, NOT etc. Additional choices may e.g. be presented in the form of check boxes, lists, pull-down menus, etc. to indicate choices like closeness of words, use of synonyms, use of phonetics, etc. Additionally, help, instructions, tips and other information like e.g. document of the day may be presented to the user.

The keywords and possible additional choices specified by the user are registered in step (103) and stored in an appropriate memory, e.g. RAM, hard disk, etc.

The user specified choices are use in step (104) to retrieve references to the corresponding information from different information sources, which may include both structured data (e.g. databases) and unstructured data (e.g. the Internet). The retrieved information is preferably references/links to relevant information in a number of information sources or alternatively the relevant information.

The information is retrieved by using relations between different objects, where an object could be anything contained in the domain being searched and being able to contain any form of information. Examples of objects are: documents comprising text, sound, video, and pictures,
- a user,
- a prior collection of information,
- other users' collection of information,
- chat rooms
- archives,
- news groups,
- services,
- sound,
- video,
- pictures,
- e-mails,
- etc.

Each object has a context representation defining the preferences of the object and its relations to a number of other objects. For example, each piece of information may have relations to a number of other pieces of information as well as to other users, and the users may have relations to pieces of information and other users. These relations are used to link information and users together who are connected in a number of ways. For example, a relation could exist between a document describing a car and a user who has participated in a chat room where the subject was cars. The document would have a relation to the chat room and the user would have a relation to the chat room because he had participated.

So a search finding the document describing a car would also return the user and the chat room because of their mutual relations. This gives a higher probability that the returned objects contain information with a higher information value.

In step (105) the retrieved references to information are presented to the user. In the prior art this presentation of information is typically done by displaying a list, usually of a great number, of links to the found relevant information e.g. sorted with respect to how well the information contains the user specified keywords in accordance with any specified constraints (Boolean rules, use of phonetics, etc.). This way of presenting information is not very useful if the number of links is very large, e.g. 10,000, and information most relevant to or interesting for the user is halfway down the list.

According to this invention the presentation of retrieved references to information is preferably done by displaying several windows, where the number of windows may reflect how experienced the user is or may depend on what the user has chosen. The result of the search is shown as one or more lists, dependent on the user's preferences and/or experience, sorted according to different criteria. In this way a user has a better possibility of finding interesting and relevant information faster.

All the windows will be explained in greater detail in connection with FIGS. 2A 2F which show an exemplary user interface using this invention.

Additionally, the user is presented with additional choices and information. This enables a more process oriented way of searching as the user can continue the search based on updated information and thereby be guided through the search process instead of starting all over again if the relevant piece of information was not identified right away. The additional information presented to the user may e.g. be related topics, other users having the same interests, etc. The additional information will be described in greater detail in connection with FIGS. 2A 2F.

In step (106) the user has to decide whether he wants to add one or more references to information that the user finds relevant or interesting to a public virtual topic room, containing references that different users have found relevant for that particular topic. There is a virtual topic room for each topic. The *method will suggest a virtual topic room at the beginning of a search process on the basis of what the user specifies.

The user may also collect information in a private collection of information containing the user's own collected references independent of the specific topic being presented at the time.

The user continues the search by selecting any of the presented additional choices, and the method jumps to step (103) where the process of retrieving and presenting information is repeated together with selecting references to the virtual topic room and the presentation of additional choices, thereby better guiding the user to what he is interested in, which may be a refinement of the current search, a related topic or even a completely different area of interest.

In this way the user helps building a public virtual topic room, adding his subjective information value in a dynamic process. Virtual topic rooms (e.g. for different search processes) together form a hierarchy of virtual topic rooms.

The method terminates or initiates a whole new search process e.g. for a different topic when the user so chooses. If the user terminates, he will have the choice of continuing the search process the next time he logs on.

Preferably, the context representation of each object affects/influences all the other objects with which it is in contact during the search process. This ensures a dynamic update of the relations between the objects and their properties.

In this way a relation is made when a user selects a document, and some of the user's relations to other objects are transferred to the document, and vice versa. The objects react and influence each other by contact. This gives the advantage that knowledge, properties, and attributes of the user is tied to the document, which may be used to determine the potential information value for both the user and other users. The same applies the other way around when knowledge, properties, and attributes of the document are tied to the user, since if the user was interested in this particular document, it is more likely that he is interested in a document showing similar properties or attributes.

In this way every object of the system is described/categorised via its relations to and its interactions with other objects; for example, a picture may be described/categorised by who uses it and/or refers to it, under which topic in the topic hierarchy is it located, which news groups use it, which documents contain or have a reference to it, etc. These objects themselves, i.e. which user, which topic, which news group, which document, etc., are related to other objects and so on.

A user may e.g. be categorised by the information, e.g. documents, chat rooms, other users, topics etc., to which the user refers in his private collection of information.

A document may e.g. be categorised by the users, other documents, topics, chat rooms, etc., which refer to the document and/or use it.

As the user collects information, he hereby gradually and continuously participates in categorising every object that is part of the ongoing search process in one way or another. Even the search process itself may be categorised. Every object being part of the process has its context representation/relations changed depending on the other objects with which it comes into contact.

In the process, a virtual topic room is made for each topic which is organised in a hierarchy of topics.

This categorisation is dynamic and collectively subjective as opposed to a transaction oriented type of searching where keywords are matched against predetermined categories determined by others.

Figure 2A:
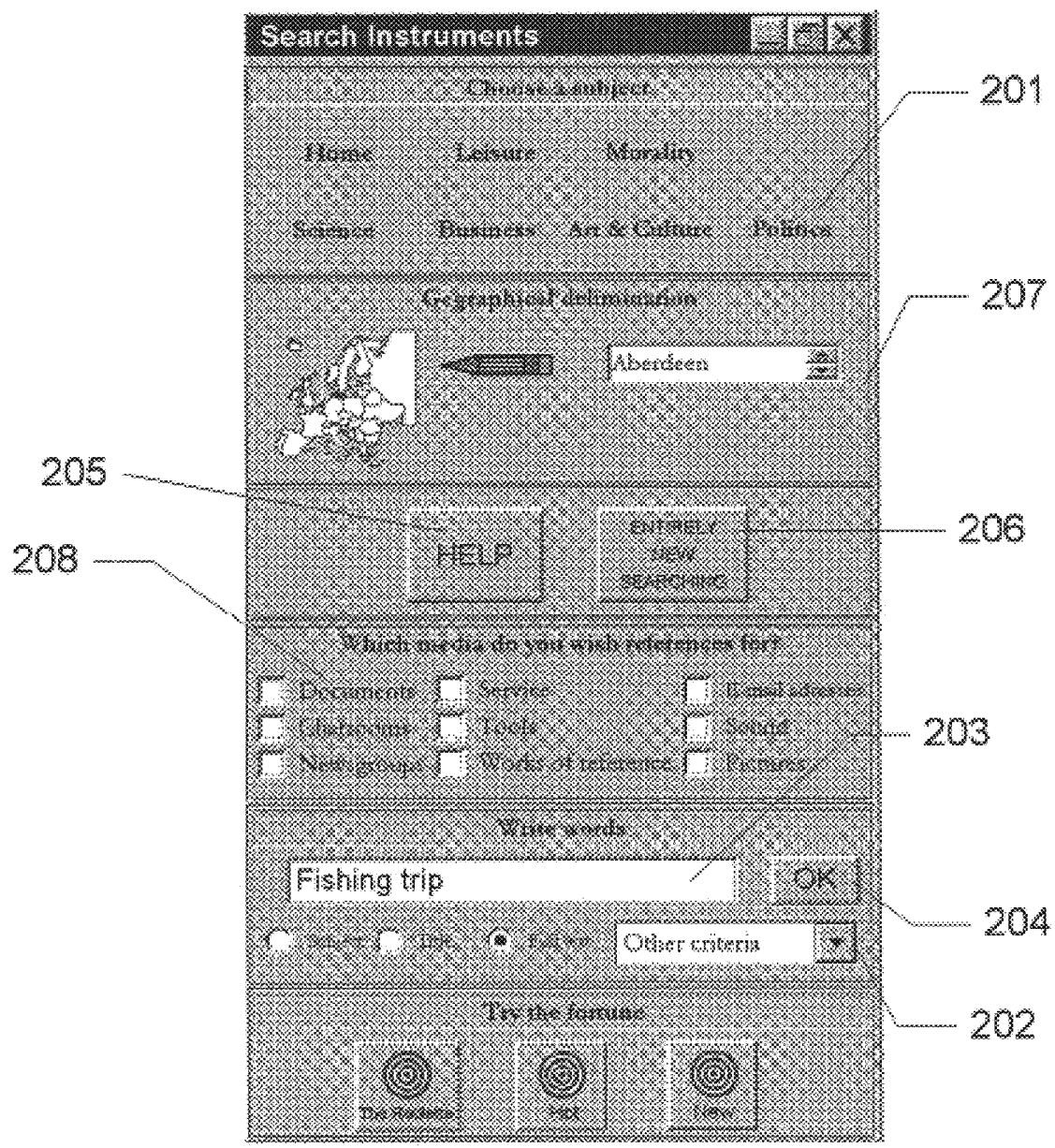
FIGS. 2A–2F illustrate the different windows of an exemplary user interface.
Figure 2B:
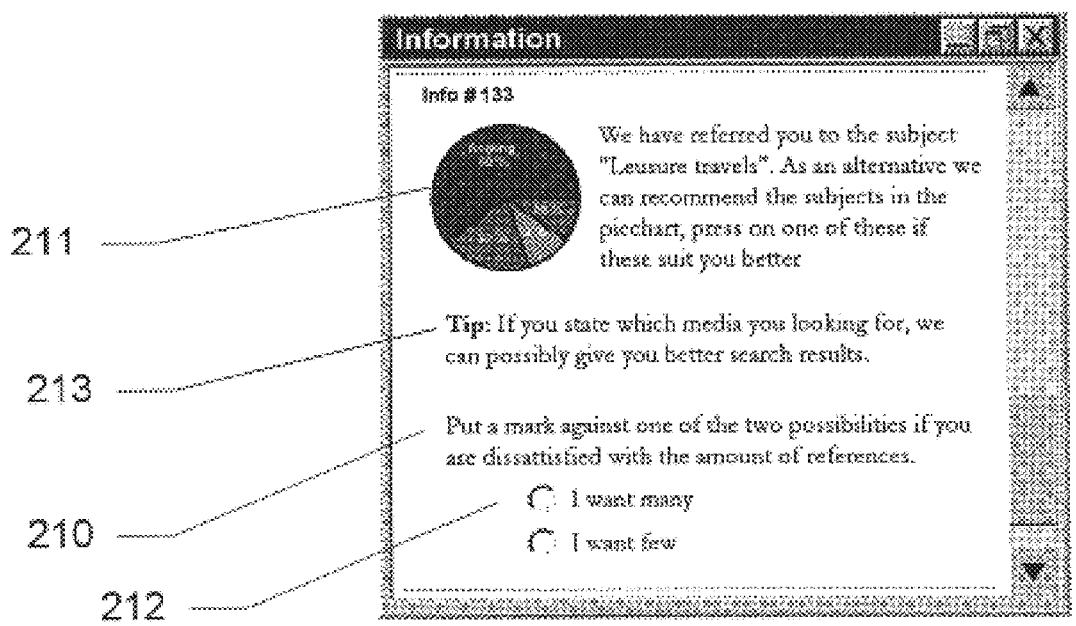
Figure 2C:
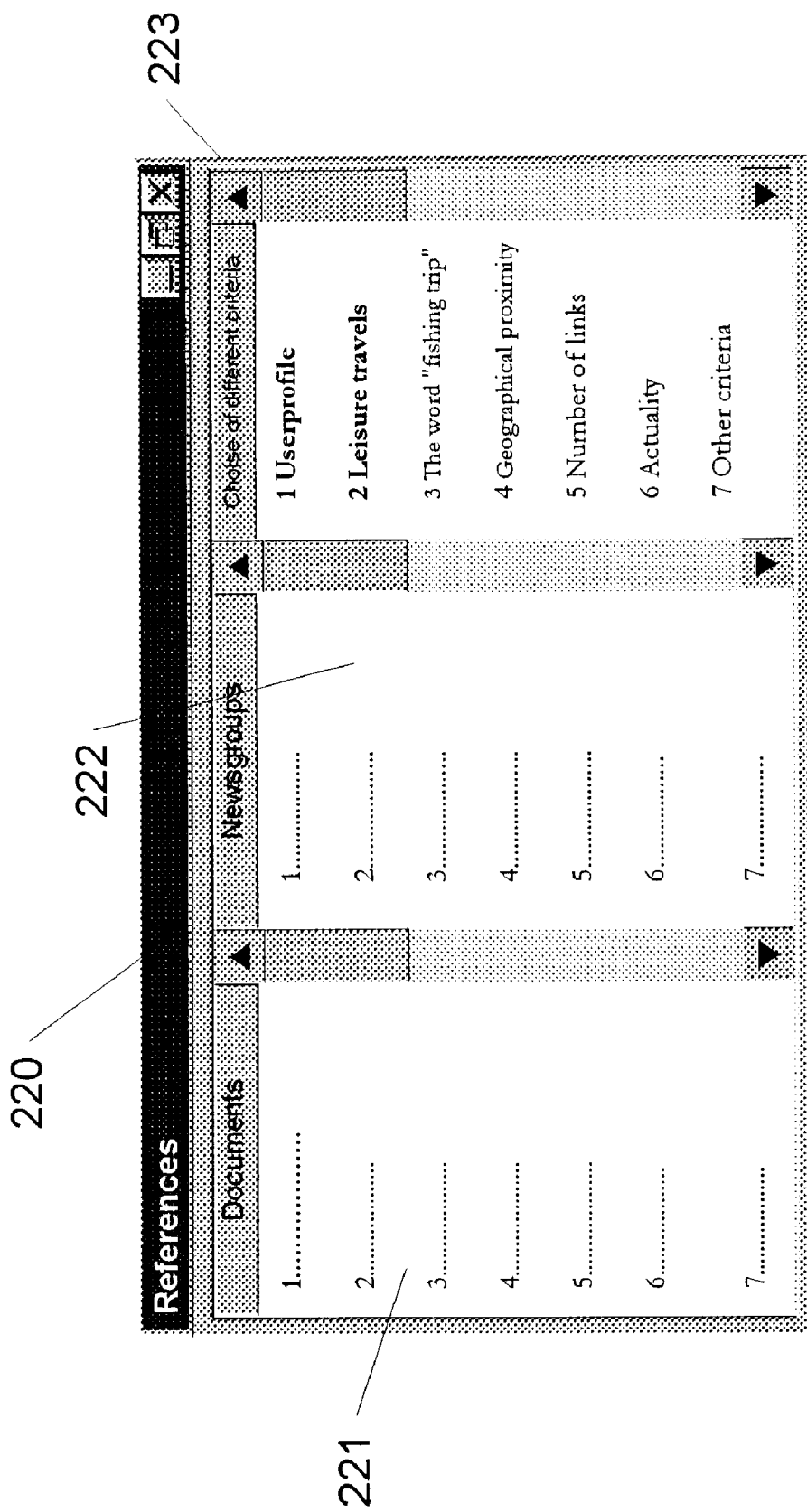
Figure 2D:
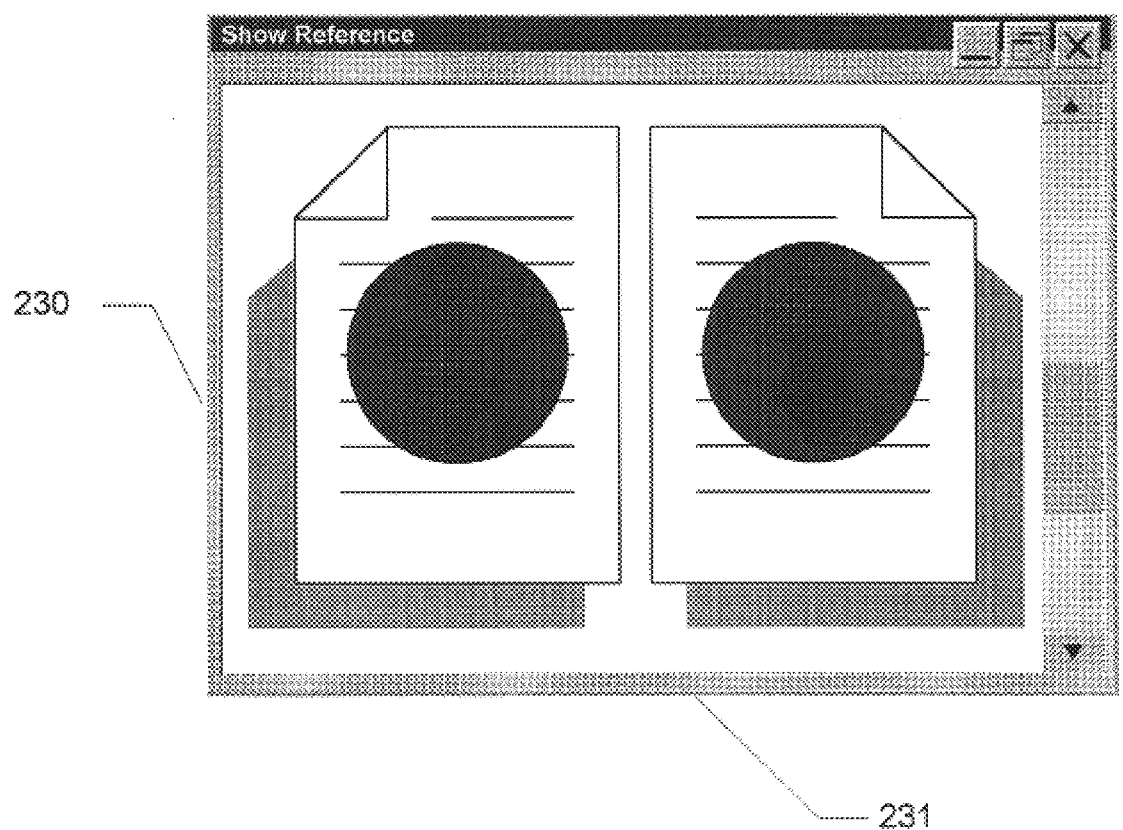
Figure 2E:
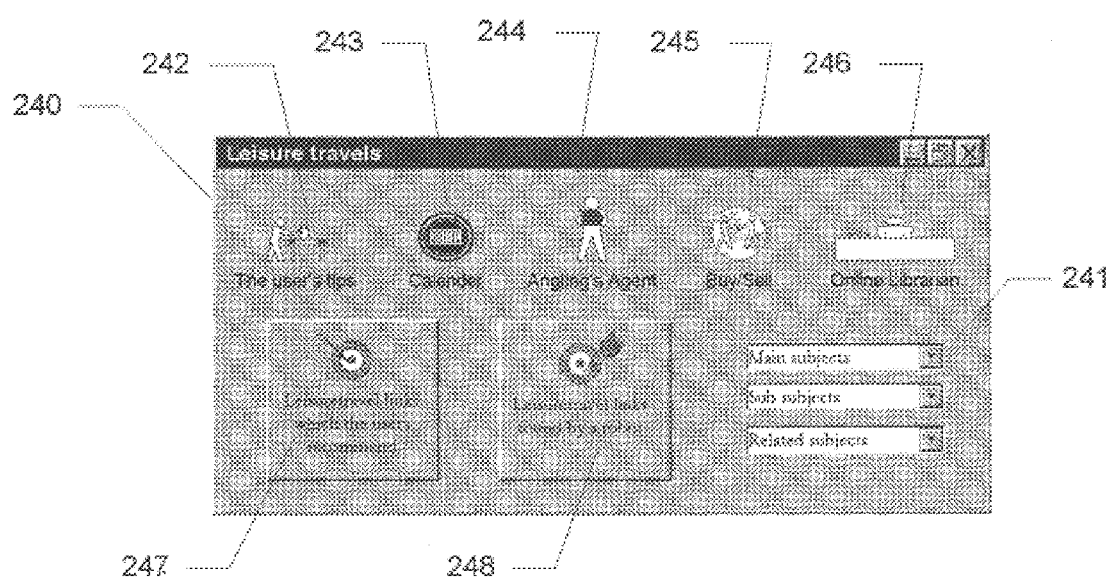
Figure 2F:
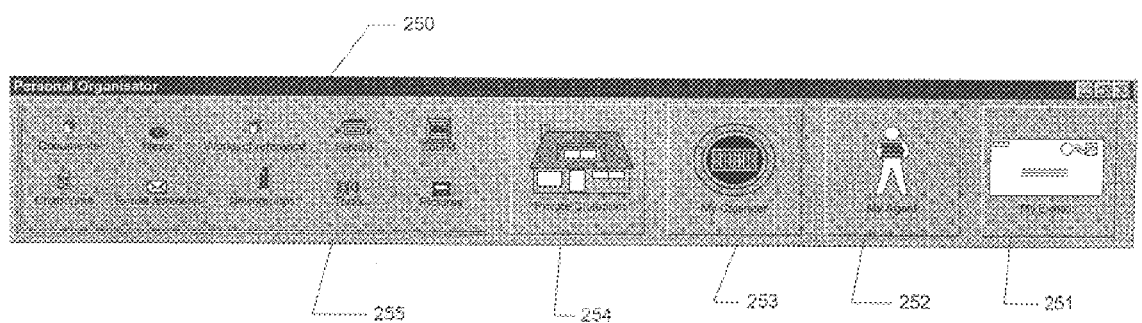

FIGS. 2A 2F illustrate the different windows of an exemplary graphical user interface. The windows will be described separately.

FIG. 2A shows a window called topic window for initiating a search process and receiving input during the process. Subject part (201) shows the most used top categories, i.e. the most general virtual topic rooms, e.g. Home, Recreational, Moral/Life Philosophy, Science, Business, Culture/Art, and Politics. An experienced user can exchange the default virtual topic rooms with customized favourite rooms.

In the part (202) a user may specify one or more keywords representing what the user wishes to find information about at an input line (203) together with other criteria like closeness of words, use of synonyms, use of phonetics, etc, which may be presented in the form of bullets, list boxes or the like. When the user has specified all the criteria, he presses a button (204) to initiate the search and retrieval of relevant information.

Another part is the geographical part (207) which is used to restrict the search to geographical regions.

In another part (208) the user specifies the kind of objects (documents, pictures, chat rooms, etc.) to which the user wants references.

There is also a help button (205) for getting online help and a button (206) for starting a whole new search process with a corresponding new suggested virtual topic room.

In general, any change of settings of the windows may be presented to the user during the search process which may reject or accept the change by a simple dialogue. Preferably, if the user accepts a proposal then more proposals will be made, and if the user rejects then fewer will be made.

FIG. 2B shows an Info Window (210) where information is communicated back to the user regarding the understanding of the present step in the process together with suggestions (212) to which the user can select an answer, tips (213), etc. This information is related to the state of the process and different ways of communicating are also adapted to the state of the process.

Shown is e.g. a pie chart (211) showing graphical information on the results in this particular state of the process to assist the user. For example the pie chart (211) could indicate the languages of the referenced information, or could e.g. show the distribution of the information with respect to categories in a hierarchy. Other graphical and text indicators may be used as well.

The information presented to the user by the pie charts (210, 211) emphasises the focus on differences instead of unity, which makes the user able to continue the search process in a direction he finds interesting. That is if many different subjects are listed, at least some of them may interest the user.

FIG. 2C shows a Reference Window (220) where the references to information (221–222) of the search process in this particular state are shown in different ways. In this example, the lists are sorted according to two different types of all the supported types, i.e. documents and news groups. The user may specify interest in references to information on these two types only, but has the possibility of selecting fewer or more types (See FIG. 2A, 208). This sorting according to different criteria enables the user to locate an interesting piece of information faster. The sub window (223) shows other criteria according to which the search result could be sorted. It is possible to select combinations of criteria from the sub window (223). Selecting one of these may exchange an existing sub window or expand the. Reference Window (220) to fit another sub window.

Selecting a reference in the sub window (221, 222) will present that particular document, news group, etc. in another window (230 shown in FIG. 2D), as will be described later.

FIG. 2D shows a Show Reference window (230) where the information (231) of a selected reference is shown. This may be a home page on the Internet, Intranet, etc. This window (230) will always show a specific result regardless of the type of the information, i.e. a chat room, e-mail address, a sound file, etc.

FIG. 2E shows a Virtual Topic Room window (240). where a specific topic is shown, which is a guess of the most relevant one on the basis of the ongoing search process, or is a topic specified by the user. The user can always select related topics in the list boxes. 241 and thereby navigate in the topic hierarchy. The virtual topic room looks very different depending on which topic is currently shown. This room is collectively made by all the users, and in this example the following services are shown: User Tips (242), Calendar (243), Agent (244) for the current topic, Online Store (245), Online Help (246), all related to the current topic.

FIG. 2F shows a Personal Organiser window (250) where personal services such as e-mail (251), Personalised Agent (252), Personal Calendar (253), Private Chat-Room (254) are shown. An Information Organiser window (255) is also shown where quick access to different types of personal information can be obtained. By selecting Documents an overview of the personal documents is shown, which can be viewed, edited, etc. Similar functions are shown for News, Chat rooms, e-mail addresses, Encyclopaedias, News groups, Services, Tools, Sound, and Pictures. It is in this window the user may place references to information that the user wishes to keep for later use.

The user interface shown in FIGS. 2A 2F is just one way in which the communication between the user and the search engine could be provided. Other interfaces of another graphical appearance may be used just as well without leaving the scope of protection of the present invention, as set out in the claims.

Figure 3A:
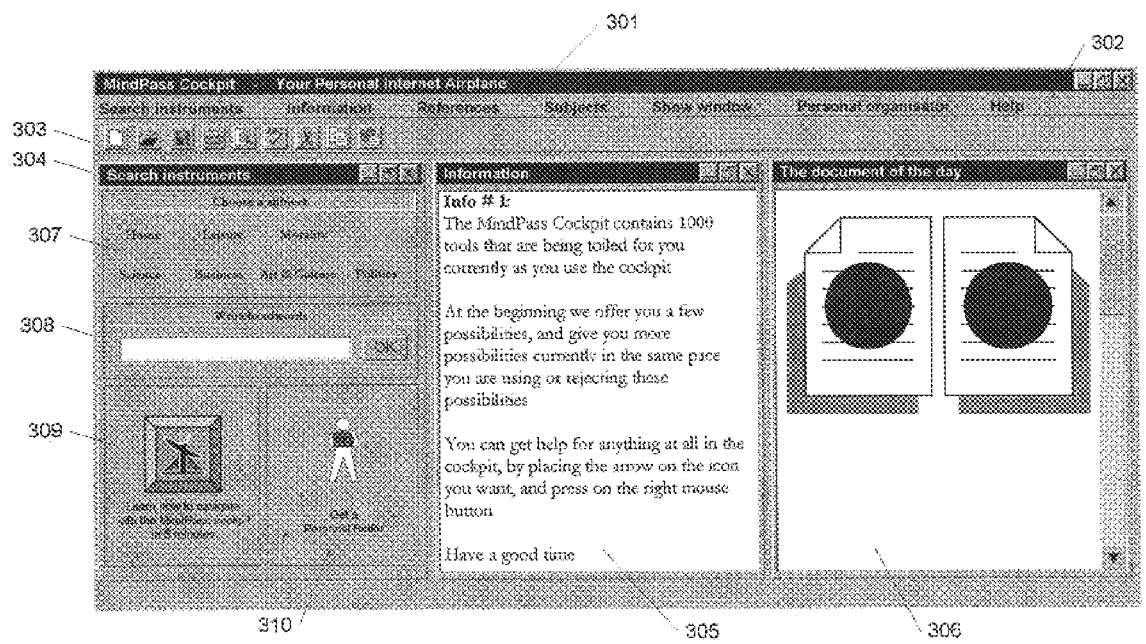
FIGS. 3A–3C illustrate different stages of a search process.
Figure 3B:
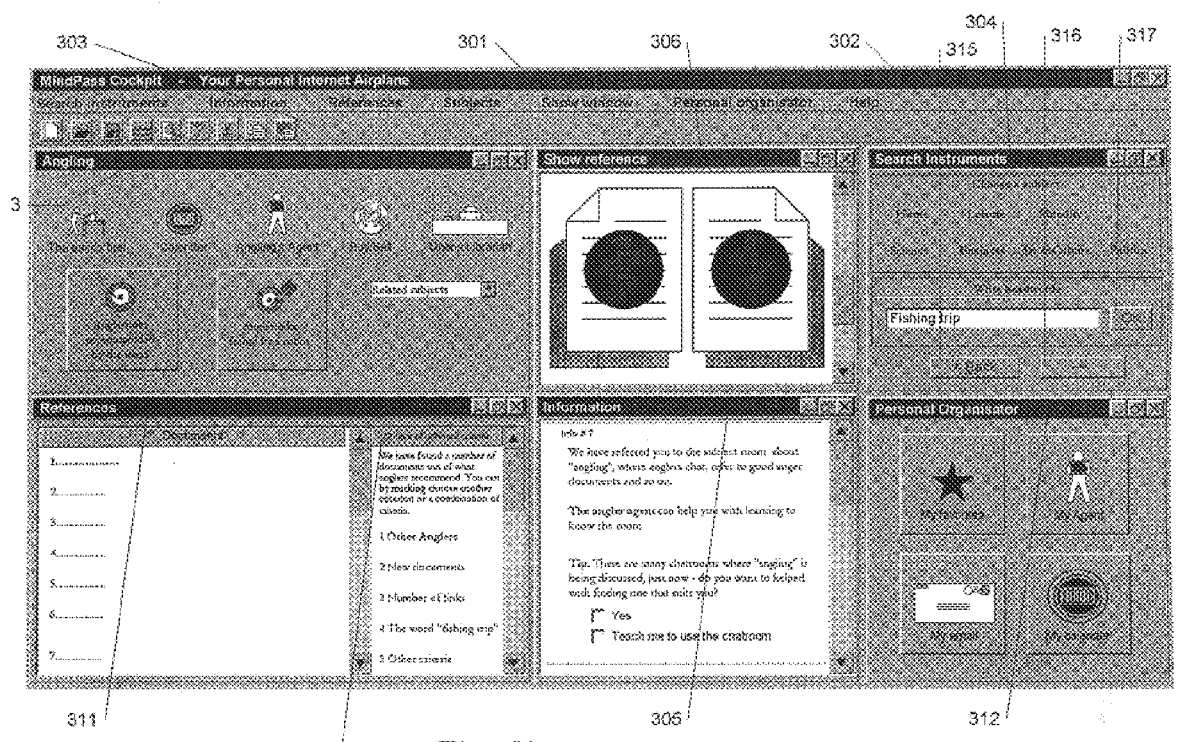
Figure 3C:
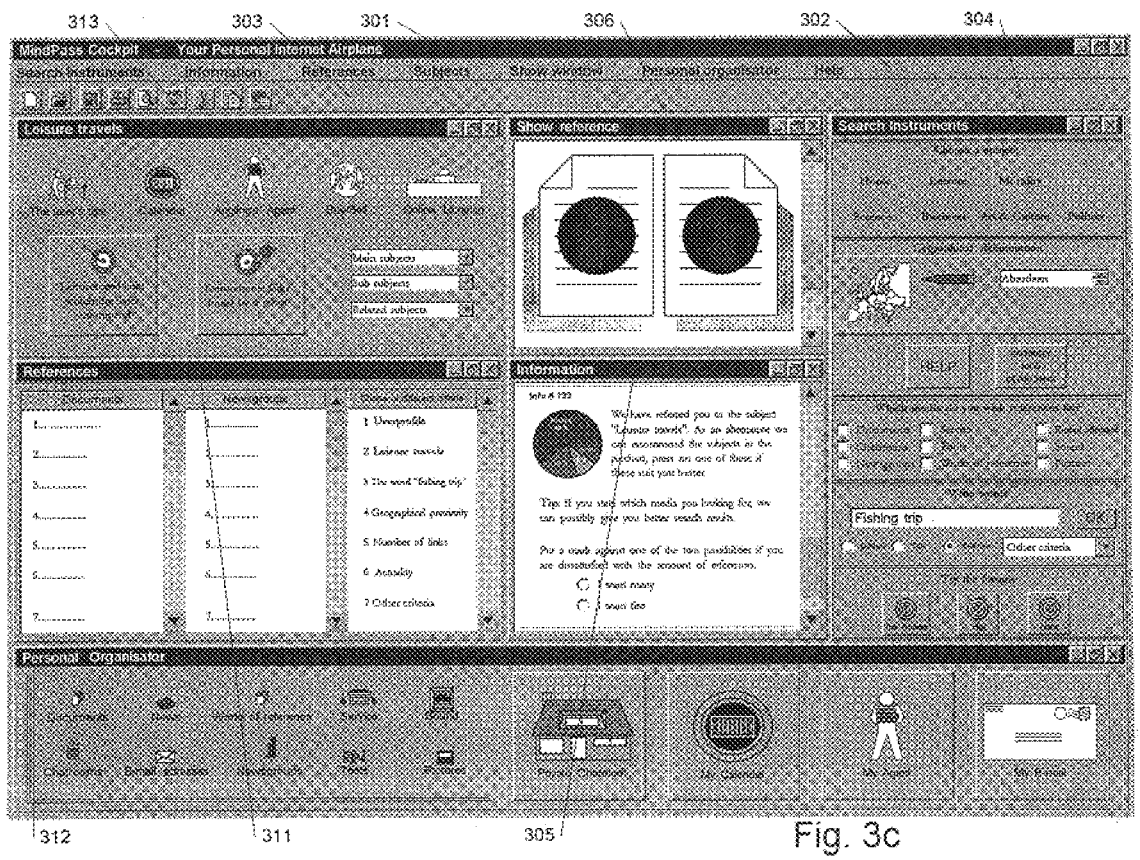

FIGS. 3A–3C illustrate different stages of a search process.

FIG. 3A shows the beginning of a search process. Shown is a 'Cockpit' (301) forming the frame of the search process. Different menus (302) give direct access to different windows of information, presentation and choices. A tool bar (303) presents different icons for initiating different actions.

The user is presented with few windows at first, and when the user selects one or more choices new windows appear. The complexity and number of windows presented to the user is always under the user's control. Shown are three windows (304, 305, 306). The search window (304) is where the user can specify what he wants information about. T he user can e.g. specify keywords at the input box (308). In the part (307) the user can choose a main category/subject where the user presumes the information is to be found. Additionally, an introduction to how the system works and what it can be used for may be given by pressing a button (309). A 'Personal Butler' can be activated by pressing a button (310) which, on the basis of user tests, can give answers to the most frequently asked questions, give tips, suggestions and guide the user.

The 'Information' window (305) continuously shows how the system interprets the user's selections and choices. First it is shown how the system/'Cockpit' works. It is in the 'Information' window (305) that all feedback to the user is presented on the basis of the user's choices. This gives the user a possibility of understanding how the system interprets the user's behaviour.

The last window, the 'Show Reference' (306) window, shows a document of the day which is e.g. an often visited and popular document on the Internet or the Intranet. This tells the user that the cockpit (301) does not disappear when the user selects a reference to information.

FIG. 3B shows the cockpit (301) after the user has e.g. reviewed the demonstration course and been playing a little with the options and possibilities of the cockpit (301). The user has been presented with choices and selected to have a private 'Personal Organiser' window (312) (See FIG. 2F) added as well as two extra buttons in the 'Search' window (304). One button (315) to step one step back in the search process if the user has made a choice by mistake or regrets the last action and one button (316) to indicate great dissatisfaction with the presented references.

As an example the user has typed 'Fishing Trip' in the 'Search' Window (304) and pressed an 'OK' button (317). The Cockpit (301) suggests to the user that he should continue the search process in the virtual topic room 'Angling', where also related topics will be available.

Additionally, seven documents are shown in a 'Reference' window (311), which are seven documents most recommended by anglers. The most recommended one is displayed in the 'Show Reference' (306) window. If the user is not satisfied with being referenced to angling, the user may press the dissatisfaction button (316) or choose other criteria in the 'Reference' window (311) by selecting one or more of the proposed criteria (314).

Shown are five criteria:
Other Anglers,
New documents,
Number of links,

The word "fishing trip",
Other criteria.

Potentially new references appear in the 'Reference' window (311) for each combination of criteria. For example, alternative topics/subjects like 'Leisure Travel' or 'Local Leisure' may be presented if the user deselects 'Other Anglers'. In this way the search process does not necessarily start all over again when new criteria or topics are selected.

A virtual topic room (313) is also presented to the user. This room has references to information that other users have found to relate to 'Angling'. Presented are other user's tips, events and related information for these events for anglers in the calendar, shops, and people may place advertisements under 'Buy/Sell', etc. The virtual topic room (313) is public and combines use and search by including use patterns in the information system.

FIG. 3C shows the Cockpit (301) for a more advanced user. This user is presented with a greater number of windows, information and choices. The 'Search' window (304) has been expanded by many sub windows containing additional choices like geographical delimitation, the types of objects to which the user wishes references, etc.

The user's private 'Personal Organiser' (312) also contains a library of references to information that the user has chosen to be interesting during the search process.

The 'Reference' window (311) now shows two lists of interesting references to information to two different types of objects, in this example 'Documents' and 'Chatrooms'. The user has selected two (shown in bold in (311)) criteria according to which the two lists are sorted.

A main difference is that although an average user and an expert user specifies the same keyword, e.g. 'Fishing Trip', they are treated differently both with respect to the contents of the references and the windows, choices, etc., not only because they have searched for different things earlier but because they are in a different course of their search process.

Figure 4:
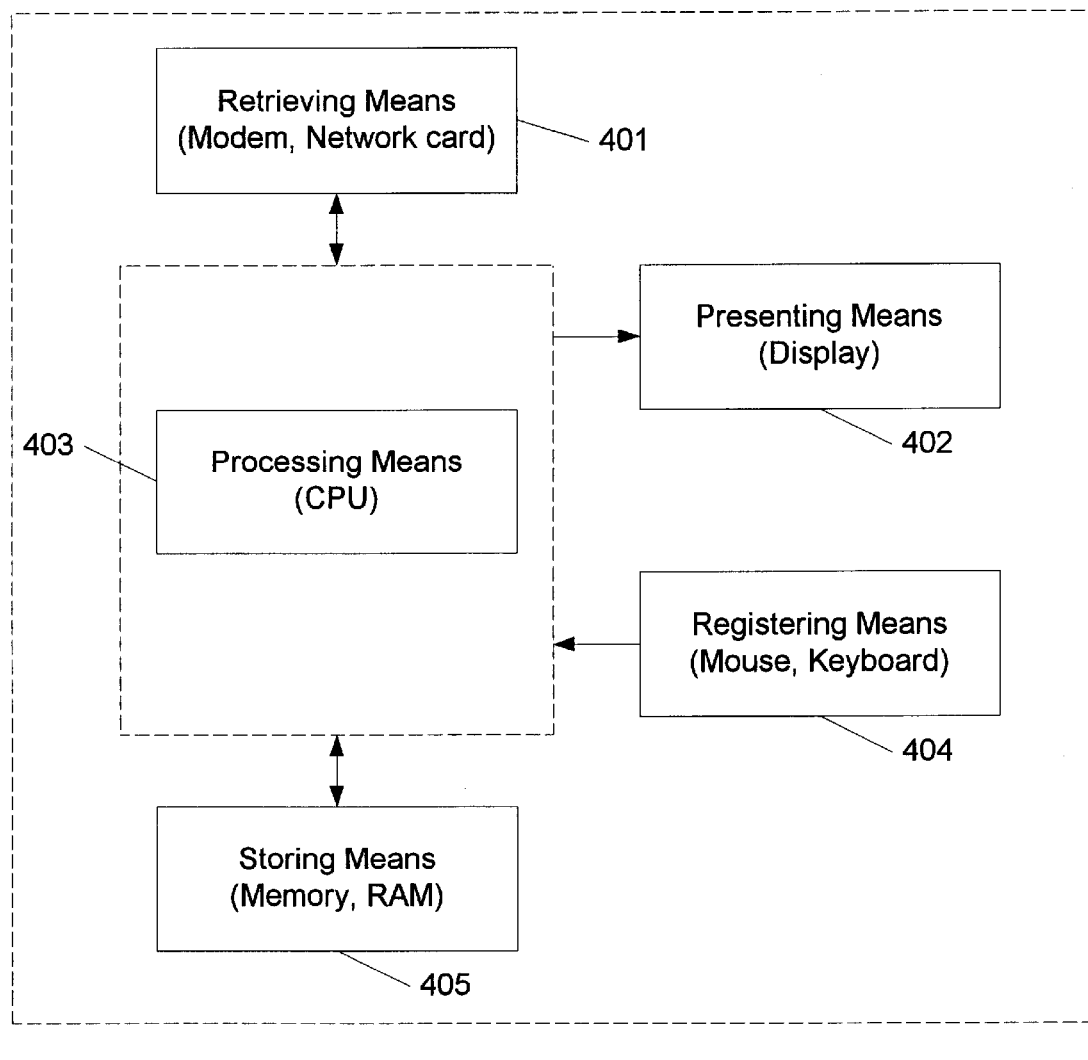
FIG. 4 illustrates a schematica block diagram of a preferred embodiment of an apparatus according to the present invention.

FIG. 4 illustrates a schematic block diagram of a preferred embodiment of an apparatus (400) according to the present invention. The figure shows processing means (403) which may be any type of CPU. The processing means (403) are connected to retrieving means (401), e.g. a modem, network card, serial cable, etc., which are responsible for communication with other computers via e.g. the Internet. The processing means (403) are also connected to storing means (405) for storage and later retrieval of results, variables, etc. The storing means (405) may be any type of RAM, hard disk, etc. (preferably a combination). The processing means are also connected to presenting means (402), e.g. a display, for displaying information, choices, results, etc. to a user. Registering means (404) are connected to the processing means (403) and provide input from the user, e.g. selection of choices, keywords, etc., by mouse and keyboard or the like.

The processing means (403) are responsible for the execution of a program which enables a user to search for various information in a continuous, dynamic search process, as described in connection with FIG. 2.

This is done by letting each object, i.e. information, user, search process, etc., have a context representation that defines the relation between a particular object and one or more of all the other objects. For example, to link information and a user or information and other information together.

The relations are built dynamically as the search process proceeds, since objects coming into contact with each other may change their relations, i.e. affect the others, context representation. Preferably, each type of object has a unique context representation, which has its unique rules, e.g. defining which types of objects/context representation it is allowed to change/affect and how, by how much, etc.

A user is presented with many types of information at the same time. Via the relations the search engine may provide information which has a potential information value for the user, as described before.

The user has to decide whether he wants to add one or more relevant or interesting references to information to his collection of information, which is a virtual topic room containing all the users' own references to that particular subject and/or search process.

In this way a user helps building a virtual topic room representing his subjective information value in a dynamic process by communicating with the apparatus (400). Virtual topic rooms (e.g. for different search processes) together form a hierarchy of virtual topic rooms.

As the user collects information, he hereby gradually and continuously participates in categorising every object that is part of the ongoing search process in one way or another, since his context representation changes the context representation of the information with which he is in touch. Even a search process itself may be categorised. Every object being part of the process has its context representation/its relations changed dependent on the other objects with which it comes into contact.

Figure 5:
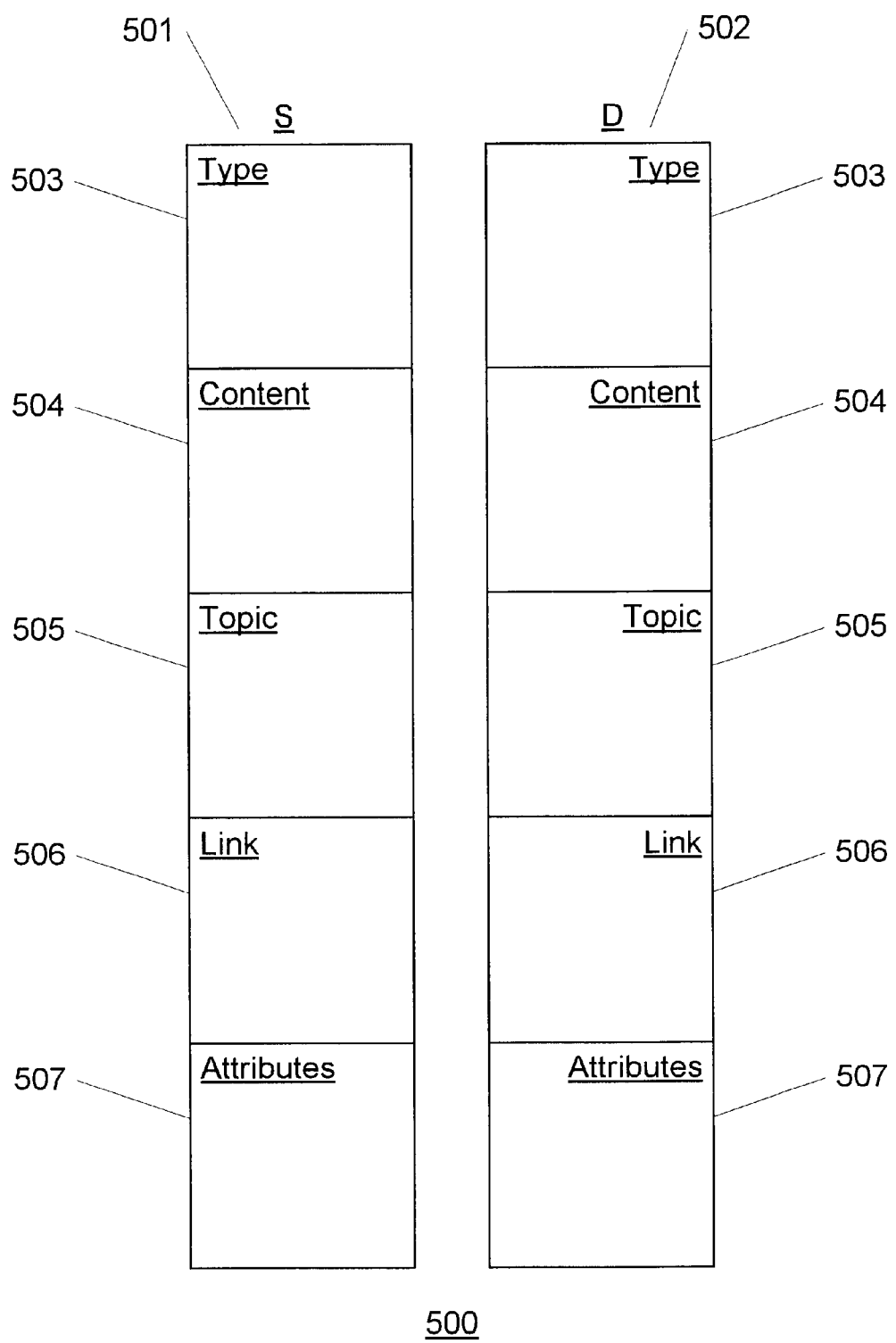
FIG. 5 illustrates an example of how the context representations may be implemented.

FIG. 5 illustrates an example of how the context representations may be implemented. As described earlier, each type of object of the information domain has a unique type of context representation.

Shown is a context representation (500) which is formed by two main parts, i.e. a first main part (501), denoted 'S', describing the properties of the original, and a second main part (502), denoted 'D', describing the properties of the object as a result of the dynamic changes arising from contact with other objects. The first main part (501) is static, and the second main part (502) changes dynamically as the object gets into contact with other objects.

But if the document was created by a user who also has a context representation (500), then the user's D-part influences the D-part of the document according to the attributes (S, Attributes). Additionally, the D-part of the document will also influence the user's D-part if the attributes of the user allow it.

For example, a context representation of a document may change/be influenced, if a user sends the document to another user, by the other user's context representation, and vice versa. Furthermore, the two users' context representations may influence each other.

A hierarchy of topics is created according to which all objects can be categorized. The hierarchy may be dynamic by letting each topic be a virtual topic room, where the users themselves may locate references to documents and other objects. A topic itself is an object with a context representation which is dynamically influenced by what the users locate in the virtual room. All other objects, which are not located by users, can hereby dynamically obtain their topic part on the basis of how much they resemble the context representation of a virtual topic room.

Each main part (501, 502) is divided into subparts; a type part (503), a contents part (504), a topic part (505), a link part (506), and an attribute part (507).

The type part (503) contains the actual type of the object, e.g. documents, sound, video, and pictures, a user, a prior collection of information, other, users' collections of information, chat rooms, news groups, services, archives, e-mails, etc.

The contents part (504) contains information relevant to the contents of a given object, the contents part of a text document may contain words from the title, headlines, stressed/quoted sections, specialised and technical words which are meaningful and/or particularly interesting.

The actual contents of an object are typically analysed to derive additional information like object type, date, author, topics and linking to other objects.

Matching actual contents between two different objects is typically a matter comparison in its simplest form. A refinement often used to further enhance quality is the allowance of fuzzyness in the search terms and the contents matched. To compensate for spelling or typing errors, dictionaries or phonetic match algorithms can be consulted. Neural networks, etc. are utilized in image and sound recognition in a similar fashion.

The topic part (505) lists every topic of a given hierarchy of topics and for each topic a corresponding probability of that particular topic being related to the ongoing search process/communication.

The topics of an object are not easily determined. This is often done manually by a human. Libraries have for example devised category systems by which books are categorized, and Internet directories like Yahoo! have a category tree, i.e. a taxonomy, by which Internet links are ordered.

A topic in a taxonomy tree describes the contents of objects in a generalized context. The taxonomy tree in itself thereby describes topics in the context of other topics with respect to generalized or specialized placement, e.g. football is specialized from sport, Art is generalized from Van Gogh. The taxonomy is not restricted to a tree, but is best described by a directed graph.

An object can have significance/informational value for multiple topics at the same time. The distribution of the significance in the taxonomy is distributed generally in three patterns. The three patterns can easily coexist for the same object, but each pattern identified can be intelligently interpreted. Thus it is interesting to identify patterns for the given objects such as:

Horizontal topic distribution significance,
Vertical topic distribution significance,
Singular topic significance.

Horizontal topic distribution in a taxonomy graph signifies an object having a general view of a subject area if the horizontal topic distribution is placed near the root of the taxonomy. It will not go into a subject in depth and is hence an object which. will .give an overview and general knowledge of an area. An example is a document discussing the topic Art from a general perspective, not with any particular time periods form or person in mind or with all of them included in the contents.

Vertical topic distribution significance in a taxonomy graph signifies an object having a strong relation with a single topic on many levels of detail.

Singular topic significance in a taxonomy graph signifies an object in a special relation with a topic. It will not broaden the overview to related topics, or seek to generalize or specialize the topic area.

As mentioned, an object is not confined to have only one pattern of the three ones mentioned above. Each pattern can be combined and occur several times. An example is a document discussing the high tech use of drugs in all areas of modern sports, while going into anabolic steroids and the making of these for muscle fiber building in depth. The document has a horizontal topic distribution significance for modern sport—all this is discussed in general. The document also discusses anabolic steroids, the use and the making of these, and thus it has a vertical topic distribution significance for drugs, anabolic steroids, the use and the making of these.

Any prior art pattern recognition mechanism can be applied to identify these three patterns after which they may be utilised, to give statistics of information coverage for certain topics. For example, which products in a portfolio are not documented in depth for all topic areas? Translated: which topics in the product area do not have documents with vertical topic distribution significance in all branches of specializations?, and to find people with certain skill characteristics. For example, who has a general overview of French foreign affairs? Translated: which person has a horizontal topic distribution significance of the topic French foreign affairs?

The Link part (506) contains information regarding the link structure for a given object, e.g. which other objects link to a given object and to which other objects the given object links, and which relations exist between the given object and other objects. For example, an Internet HTML document and other document standards may link to other documents or objects. The link structure can be utilized to analyse numerous aspects from information sources.

A known method (Kleinberg, IBM) mentions an analysis of links which will locate hubs and authoritative centers in information sources. An information hub is typically an index of links to numerous other objects. Authoritative centers are highly referenced information areas, a single object or a highly interconnected group of objects.

The analysis of links and relations between objects can be further refined by applying a weight to each link or mathematical edge in a link graph. The weight signifies a propagation weight with which authority is propagated to adjacent objects.

The link structure can be built using knowledge from for example HTML or XML documents, but other rules for linking can be applied. For persons this could e.g. be derived from frequent communication between groups of persons.

Besides assigning relative authority to objects, which can be utilized to identify qualified objects, the link structure can be used in data relation analysis to identify information connections for e.g. competition analysis, back tracking of information sources, etc.

The attribute part (507) lists parameters which are similar for each type of object. Each parameter may have different types of values. For example each context representation may contain an attribute that indicates which other context representations are able to influence that particular context representation, in what way it is influenced, and by how much. The exact nature of this attribute varies with the type of object. Attributes for objects are simple information by nature. Examples of attributes are contents length, author, languages, dates significant for the object, lix number (readability index), and title may be specified, etc. The matching of attributes is simple and straightforward.

A dynamic context representation of all objects with type, contents, topics, links and attributes ensures a general and similar description of all actors in an information system. The representation method can then be utilized for matching in an information search system.

In order to achieve reasonable speed and functionality certain demands must be fulfilled, as will be described in the following.

The objects demand an architecture which must conceptually model two function areas. An indexing layer to make the objects searchable, and a layer to interpret the processes in an information system.

The design architecture must meet demands for scaleability since the amount and growth of information is very high today. The number of documents on the Internet is typically measured in billions and the number of users in hundreds of millions, etc.

The index layer must be able to index all date structures of the object: type, contents, topics, links, and attributes. Each data structure is somewhat different, which demands different types of indexes.

The type, contents and attributes must be indexed according to a name or a simple textual representation of a type or an attribute. This can be implemented using standard methods of indexing, for example via a standard SQL database solution. The type and the attributes can for example be looked up in a file system or other repositories. The languages used can be extracted by for example using the trigram algorithm. Many more features can be derived and extracted by analysing the contents or getting information from other sources.

The link structure between objects is very complex and large as well. To build the graph structure and make it ready for indexing, one must solve multiple differential equations with multiple unknown variables. The processed link structure must have identified all authoritive centers and hubs, which must be made searchable through indexing.

The topic index contains the associated topics for each object. As mentioned, certain patterns must be identified and the identified topics and patters must be made searchable through indexing. A pattern recognition method must be applied and adapted for a solution such as a neural network.

The layer interprets all behavior in the information system as a process. As discussed earlier, the distinction between a transaction oriented information system and a process oriented system is the key. Examples are communication from a user to the system can be seen as one process, i.e. reading documents, searching for news, sending email, etc. It will influence the read information from a document or a news source and it will influence both the user who receives and sends the email, and communication in a discussion forum by several persons will influence the object for the discussion forum and it will influence the persons participating.

The propagation of either part of the parameters of an object to other objects can be done using various statistical methods. The statistical method applied must:

be capable of modelling temporal state development, be aware of distortion and uncertaincy, and allow weighing of each parameter to model individual propagation rate of the parameters.

Both Markov models and Baysian dynamic lineary models can be applied to give a suitable solution.

What is claimed is:

1. A method of searching and presenting electronic information from one or more information sources, said method comprising the steps of:

providing one or more information sources, presenting one or more choices to a user, registering one or more user specified choices, using said one or more user specified choices to retrieve at least two references to information from said one or more information sources, providing a search result comprising said at least two references to information, wherein a first context representation is defined for each of at least two references to information of said references to information, a second context representation is defined for each of at least two other users of a group of other users, a third context representation is defined for said user, and each context representation comprises one or more indications representing other contexts with which each is related, presenting the search result to the user in a number of different ways at the same time based on one or more context representations selected from the group consisting of said third context representation for said user, said first context representations for said at least two references to information and said second context representation for said at least two other users of a group of other users, presenting additional choices to the user relating to the search result based on one or more context representations selected from the group consisting of said third context representation for said user, said first context representations for said at least two references to information and said second context representations for said at least two other users of a group of other users, and modifying at least one context representation on the basis of one or more of said context representations, wherein retrieval of said one or more references to information further uses said one or more indications of at least one context representation.

2. The method of claim 1, wherein the method further comprises the steps of enabling a user to select one or more references to information to review the information, and enabling a user to collect references to information in a collection of information.

3. The method of claim 1, wherein said step of modifying at least one context representation comprises modifying said third context representation for said user on the basis of one or more context representations, being relevant for said search result, selected from the group consisting of said first context representations for said at least two references to information and said second context representations for at least two other users of a group of other users that are similar in at least one aspect to said user.

4. The method of claim 1, wherein said step of modifying at least one context representation comprises modifying a first context representation for a reference to information on the basis of one or more context representations, being relevant for said search result, selected from the group consisting of said first context representations for at least two of said references to information, said third context representation for said user and said second context representations for said at least two other users of a group of other users that are similar in at least one aspect to said user.

5. The method of claim 1, wherein said step of modifying at least one context representation comprises modifying a second context representation for one other user on the basis of one or more context representations, being relevant for said search result, selected from the group consisting of said second context representations for at least two other users of a group of other users that are similar in at least one aspect to said one other user having its context modified, said first context representations for at least two of said references to information and said third context representation for said user.

6. The method of claim 1, wherein the step of modifying at least one context representation is done when a user executes an action on the basis of one or more references to information or executes an action on the basis of one or more different users.

7. The method of claim 1, wherein the step of modifying at least one context representation is done when the context representation is related with another piece of information or is related with a user.

8. The method of claim 1, wherein each reference to information comprises information of one or more of documents comprising one or more of text, sound, video, and pictures, a user, a prior collection of information, other users' collections of information, chat rooms, news groups, services, archives, sound, video, pictures, or e-mails, and each type of information has a unique context representation type.

9. The method of claim 1, wherein each context representation comprises a type part, a contents part, a topic part, a link part and an attribute part.

10. The method of claim 9, wherein the link part of a given context representation comprises information regarding which other objects link to a given object, to which other objects the given object links, and which relations exist between the given object and other objects.

11. The method of claim 9, wherein the topic part of a given context representation comprises a probability number for each topic of a given hierarchy of topics reflecting the probability of information referenced by that given context representation having a potential information value.

12. The method of claim 9, wherein the attribute part of a given context representation reflects which other types of context representations can affect the given context representation, when it can be affected, and by how much it can be affected.

13. The method of claim 1, wherein each context representation comprises a first part and a second part, the first part comprising information on the information referenced by the context representation, and the second part comprising information on the change of the context representation as a result of its being affected by other context representations.

14. The method of claim 1, wherein the method is used in a search engine.

15. An apparatus for searching and presenting electronic information from one or more information sources, said apparatus comprising:
providing means for providing one or more information sources,
presenting means for presenting one or more choices to a user,
registering means for registering one or more user specified choices,
retrieving means for retrieving at least two references to information from said information sources using said one or more user specified choices, and
processing means for providing a search result comprising said at least two references to information, the processing means further comprising a first context representation defined for each of at least two references to information of said references of information, a second context representation defined for each of at least two other users of a group of other users, and a third context representation defined for said user, wherein each context representation contains one or more indications representing other contexts with which each is related, wherein the processing means further presents the search result to the user in a number of different ways at the same time based on one or more context representations selected from the group consisting of said third context representation for said user, said first context representations for said at least two references to information and said second context representations for said at least two other users of a group of other users, presents additional choices to the user relating to the search result based on one or more context representations selected from the group consisting of said third context representation for said user, said first context representations for said at least two references to information and said second context representations for at least two other users of a group of other users, and modifies at least one context representation on the basis of one or more of said context representations, and wherein said retrieving means further retrieves said one or more references to information using said one or more indications of at least one context representation.

16. The apparatus of claim 15, wherein the processing means further enables a user to select one or more references to review the information and enables a user to collect references to information in a collection of information.

17. The apparatus of claim 15, wherein said processing means for modifying at least one context representation comprises modifying said third context representation for said user on the basis of one or more context representations, being relevant for said search result, selected from the group consisting of said first context representations for said at least two references to information and said second context representations for said at least two other users of a group of other users that are similar in at least one aspect to said user.

18. The apparatus of claim 15, wherein said processing means for modifying at least one context representation comprises modifying a first context representation for a reference to information on the basis of one or more context representations, being relevant for said search result, selected from the group consisting of said first context representations for said at least two references to information, said third context representation for said user and said second context representations for said at least two other users of a group of other users that are similar in at least one aspect to said user.

19. The apparatus of claim 15, wherein said processing means for modifying at least one context representation comprises modifying a second context representation for one other user on the basis of one or more context representations, being relevant for said search result, selected from the group consisting of said second context representations for at least two other users of a group of other users similar in at least one aspect to said one other user having its context modified, said first context representations for said at least two references to information and said third context representation for said user.

20. The apparatus of claim 15, wherein the processing means modifies at least one context representation when a user executes an action on the basis of one or more references to information or executes an action on the basis of one or more different users.

21. The apparatus of claim 15, wherein the processing means modifies at least one context representation when the context representation is related with another piece of information or is related with a user.

22. The apparatus of claim 15, wherein each reference to information comprises information of one or more of documents comprising one or more of text, sound, video, and pictures, a user, a prior collection of information, other users' collections of information, chat rooms, news groups, services, archives, sound, video, pictures, or e-mails, and each type of information has a unique information context representation type.

23. The apparatus of claim 15, wherein each context representation comprises a type part, a contents part, a topic part, a link part and an attribute part.

24. The apparatus of claim 23, wherein the link part of a given context representation comprises information regarding which other objects link to a given object, to which other objects the given object links, and which relations exist between the given object and other objects.

25. The apparatus of claim 23, wherein the topic part of a given context representation comprises a probability number for each topic of a given hierarchy of topics reflecting the probability of information referenced by that given context representation having a potential information value.

26. The apparatus of claim 23, wherein the attribute part of a given context representation reflects which other types of context representations can affect the given context representation, when it can be affected, and by how much it can be affected.

27. The apparatus of claim 15, wherein each context representation comprises a first part and a second part, the first part comprising information on the information referenced by the context representation, and the second part comprising information on the change of the context representation as a result of its being affected by other context representations.

28. A computer-readable medium whose contents are adapted to cause a computer system to search and present electronic information from one or more information sources, by performing the steps of:

providing one or more information sources, presenting one or more choices to a user, registering one or more user specified choices, using said one or more user specified choices to retrieve at least two references to information from said one or more information sources, providing a search result comprising said at least two references to information, wherein a first context representation is defined for each of at least two references to information of said references to information, a second context representation is defined for each of at least two other users of a group of other users, a third context representation is defined for said user, and each context representation comprises one or more indications representing other contexts with which each is related, presenting the search result to the user in a number of different ways at the same time based on one or more context representations selected from the group consisting of said third context representation for said user, said first context representations for said at least two references to information and said second context representations for said at least two other users of a group of other users, presenting additional choices to the user relating to the search result based on one or more context representations selected from the group consisting of said third context representation for said user, said first context representations for said at least two references to information and said second context representations for said at least two other users of a group of other users, and modifying at least one context representation on the basis of one or more of said context representations, wherein retrieval of said one or more references to information further uses said one or more indications of at least one context representation.

29. A computer program element comprising computer program code means adapted to enable a computer system to search and present electronic information from one or more information sources, by performing the steps of:

providing one or more information sources, presenting one or more choices to a user, registering one or more user specified choices, using said one or more user specified choices to retrieve at least two references to information from said one or more information sources, providing a search result comprising said at least two references to information, wherein a first context representation is defined for each of at least two references to information of said references to information, a second context representation is defined for each of at least two other users of a group of other users, a third context representation is defined for said user, and each context representation comprises one or more indications representing other contexts with which each is related, presenting the search result to the user in a number of different ways at the same time based on one or more context representations selected from the group consisting of said third context representation for said user, said first context representations for said at least two references to information and said second context representations for said at least two other users of a group of other users, presenting additional choices to the user relating to the search result based on one or more context representations selected from the group consisting of said third context representation for said user, said first context representations for said at least two references to information and said second context representations for said at least two other users of a group of other users, and modifying at least one context representation on the basis of one or more of said context representations, wherein retrieval of said one or more references to information further uses said one or more indications of at least one context representation.

* * * * *